April 14, 1970  L. BRESAOLA  3,505,947
DEVICE FOR PREPARING INFUSION EXPRESS COFFEE
TO BE COLLECTED IN A JUG
Filed Feb. 23, 1968  5 Sheets-Sheet 1

INVENTOR
LUIGI BRESAOLA
By Young + Thompson
ATTYS.

United States Patent Office 3,505,947
Patented Apr. 14, 1970

3,505,947
DEVICE FOR PREPARING INFUSION EXPRESS
COFFEE TO BE COLLECTED IN A JUG
Luigi Bresaola, 6834 Morbio Inferiore,
Ticino, Switzerland
Filed Feb. 23, 1968, Ser. No. 707,537
Claims priority, application Switzerland, Jan. 13, 1968,
674/68
Int. Cl. A23f 1/00
U.S. Cl. 99—283         6 Claims

ABSTRACT OF THE DISCLOSURE

Water flows by gravity through ground coffee in a container that is slidable into the device like a drawer and that has a perforate bottom. A cover for the container hermetically seals with the container and is cam actuated by a lever into sealing relation with the container. Hot water flows toward the container through a conduit having an extended surface, so that the water is somewhat cooled and does not burn the coffee. The coffee flows into a jug with a heater beneath it that is turned on when the weight of the coffee in the jug reaches a predetermined value.

---

The present invention relates to a device for the preparation of infusion express coffee to be collected in a jug, characterized by:

A container adapted to receive the uncompressed ground coffee and to enter, sliding similarly to a drawer on guides, underneath a bored plate acting as a shower element;

A piston located above said container and having its lower base provided with a series of holes and constituting said shower element while its side walls are provided with at least a strip for the hermetical sealing against the inner side walls of said container and its upper surface is adapted to be compressed by an eccentric element actuated by a hand operated lever to provide for said hermetic sealing;

A warm water feeding conduit located above said container in such a manner that the warm water passes, without any pressure, downwards through the ground coffee, flows out from the distribution nozzle placed below said container and is then collected in a jug;

Electric resistances heating the bottom of said jug and adapted to be turned on by a switch closed by the jug when the weight of the liquid contained in said jug reaches a certain desired value;

A flexible hose connecting, at one side, said conduit feeding the warm water to the container with, at the other side, the warm water inlet: the length and the outer self cooling surface of said hose being chosen so as to lower, of some degree, the temperature of the incoming warm water to eliminate any danger of burning the coffee.

Figure 5:
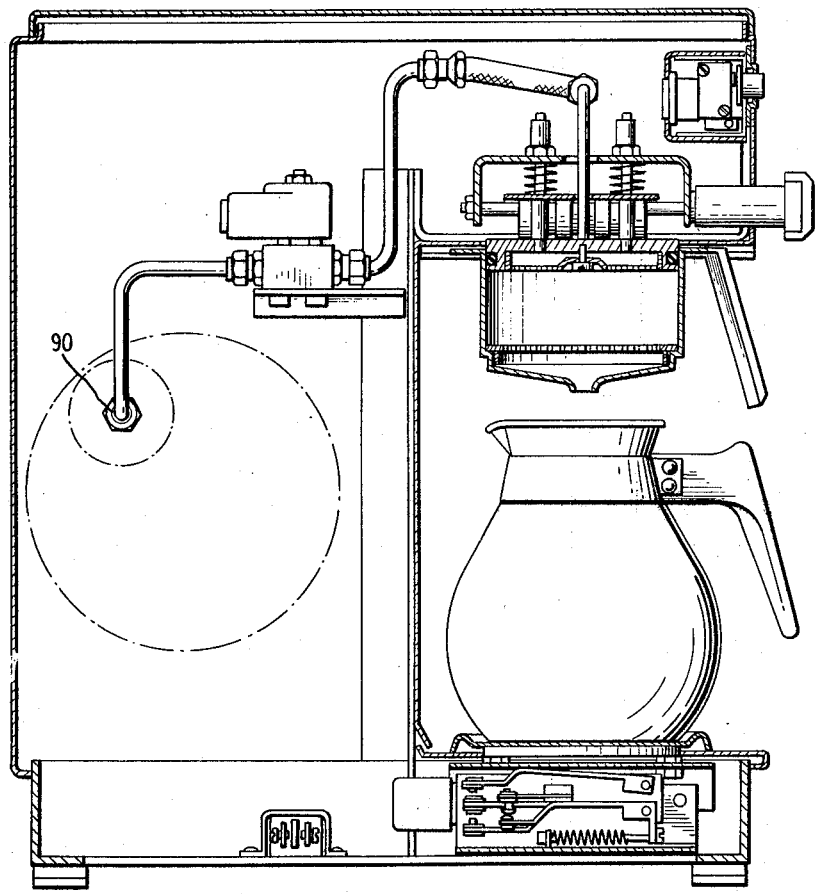

FIGURE 5 relates to the application of the device of the invention to a conventional express coffee machine.

Figure 6:
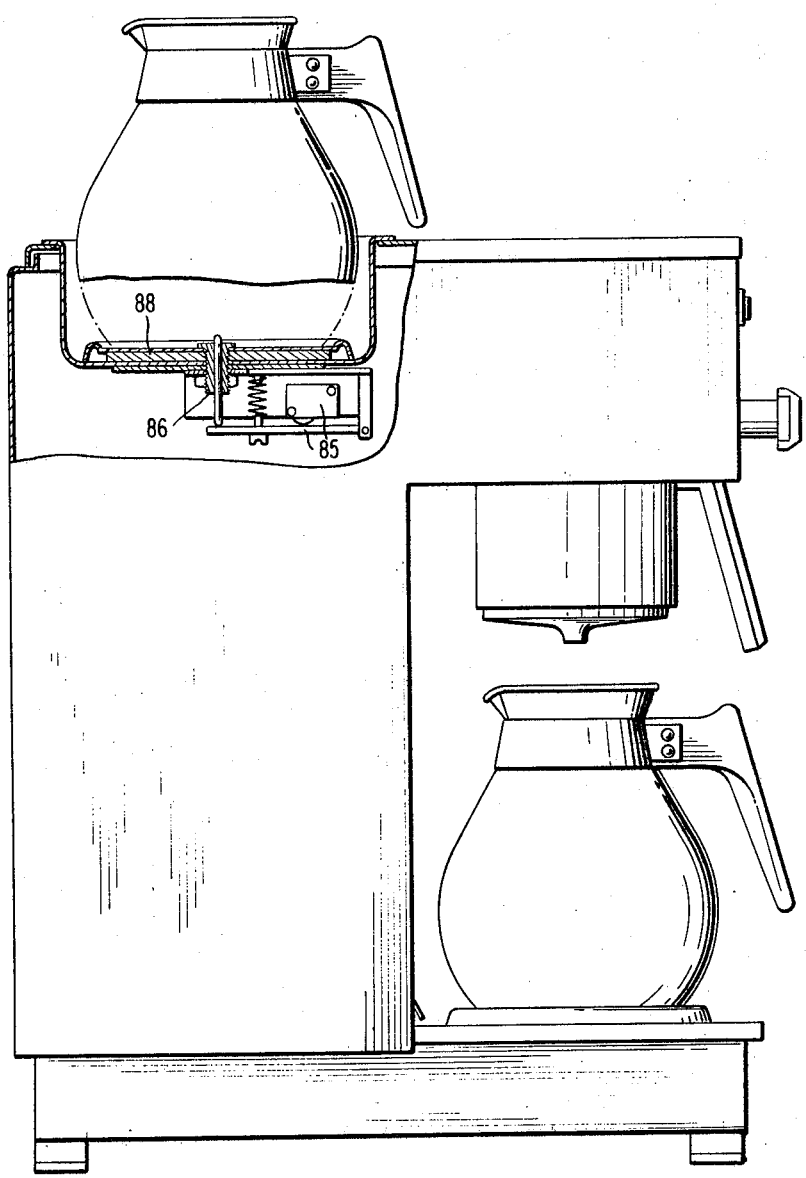

FIGURE 6 is a view of a modification wherein the device of the invention is applied to a conventional machine which has been varied to present, at its upper end, heating means suited to keep warm a reserve jug.

Figure 1:
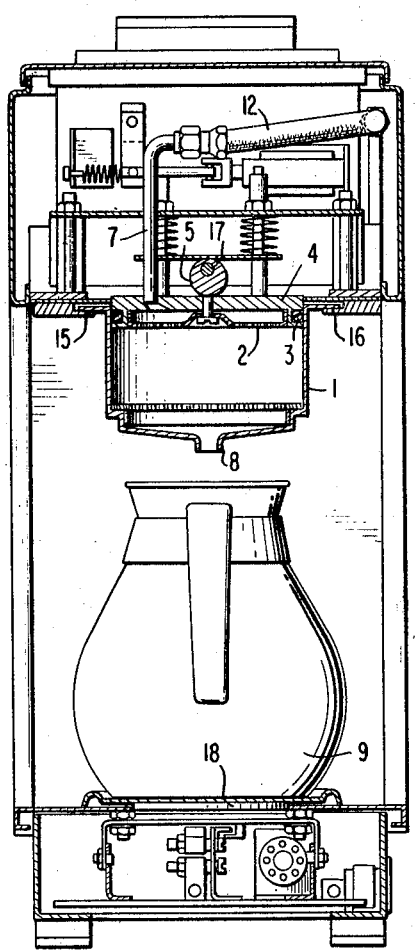
FIGURE 1 is an axial sectional view of the device of the invention.
Figure 2:
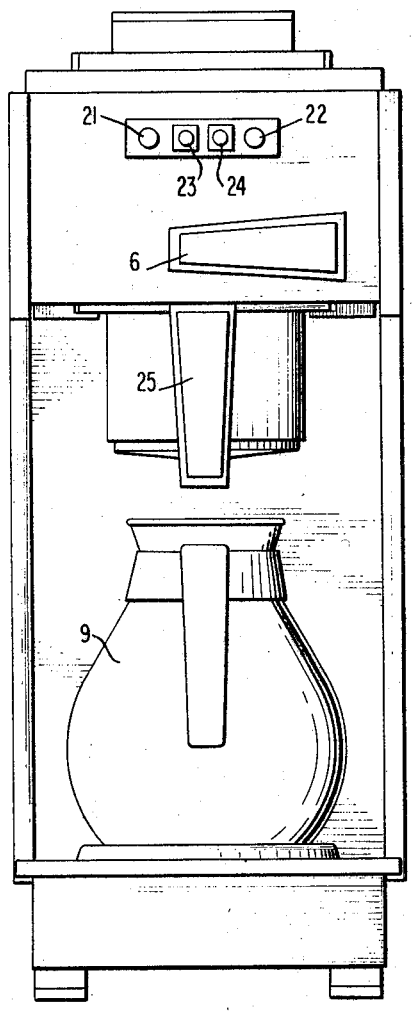
FIGURE 2 is the corresponding frontal view.

The device illustrated in FIGURE 1 comprises: the cylindrical container 1 adapted to receive the uncompressed ground coffee and to be slid as a drawer over the guide members 15–16 to enter underneath the pierced plate or shower element 2. The plate 2 forms the bottom of a piston having its side walls provided with an annular sealing strip 3 and its upper surface 4 pressed by the eccentric member 5 actuated by a lever 6 fixed to the shaft 17 (FIGURE 2).

By actuating the lever 6 so to lower the piston 2–3–4, the strip 3 provides for the hermetic sealing against the inner side walls of the container 1.

The warm water comes from the conduit 7 located above the container 1 and, without any pressure, passes downwards through the coffee powder (infusion), flowing then out of the nozzle 8 to be finally collected in the jug 9 below. The bottom of said jug (see FIGURE 3) is heated by the resistances contained in the plate 18, said resistances being turned on when the contacts 11–11' of the electric switch close as a consequence of the fact that the quantity of liquid in the jug 9 has reached a certain desired value.

At this moment, by its weight, the jug 9 acts upon the upper lever 60 which, in its turn, presses the contact 11 to close on contact 11'. The value of the weight required for closing the switch may be regulated by varying the tension of the spring 20 determining the up or down movement, the intermediate contact has to perform to touch the contact 11'.

The conduit 7 is in communication with the warm water inlet over the hose 12 (FIGURES 1 and 3), the length and the outer self-cooling surface of which are such as to lower, of some degrees, the temperature of the incoming warm water thereby avoiding any burning of the coffee.

FIGURE 2 is a view of the outer controls for the device of the invention situated on the fore part thereof and consisting of: the starting push button 21; the stop button 22; the pilot lamp 23 for indicating the general operation, the pilot lamp 24 for the plate 18 heating the jug, the lever 6 for the actuation of the eccentric element 5 and already described with reference to FIGURE 1.

The handle for the container is indicated with 25 and the jug with reference number 9.

The device of the invention may be applied to warm water feeder especially planned to this purpose or to conventional warm water feeder as well.

Figure 3:
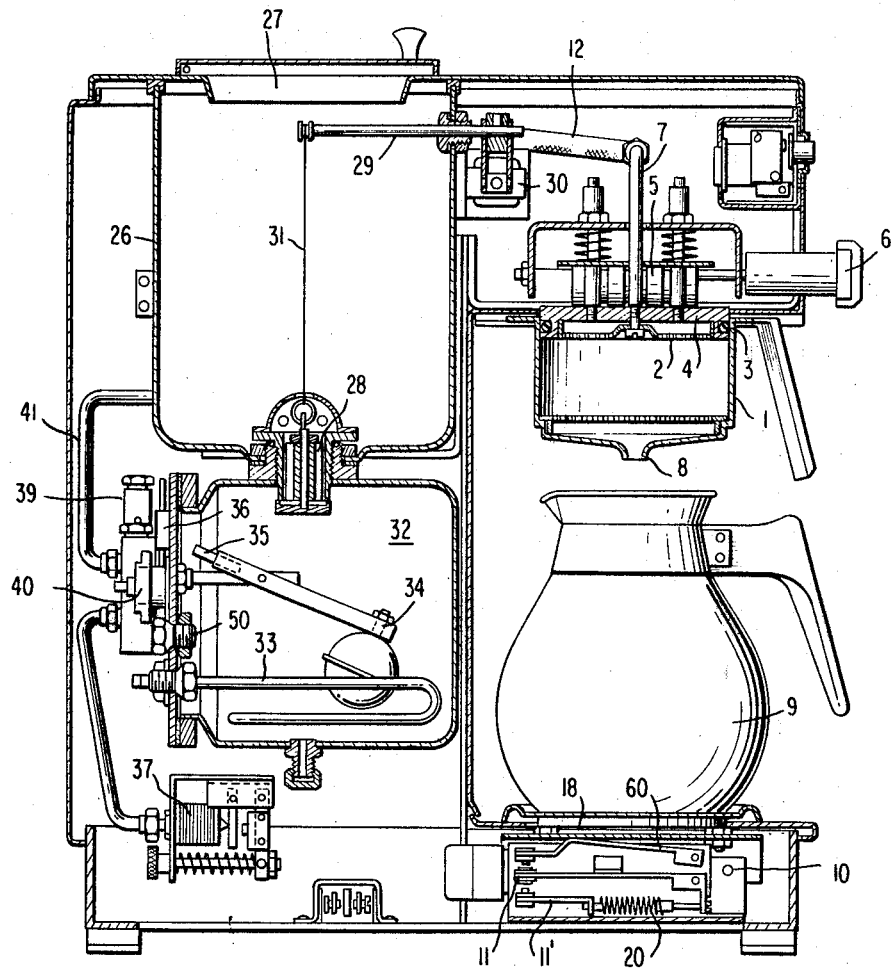
FIGURE 3 is the axial sectional view of the device of the invention as applied to a warm water feeder which does not require to be connected to the drinking water distribution plant, said feeder being especially planned to be applied to said device and forming also a part of the device of the invention.

FIGURE 3 illustrates said first case.

A certain quantity of water, e.g. 3 l., is poured into a chamber 26 having a cover 27 and a closing tap 28 located at its bottom and closing the drain opening thereof.

A rod 29 actuated by the electromagnet 30 determines, over the cable 31, the up and down movement of the tap 28 thereby providing for or hindering the water flow into the boiler 32 located below.

The heating element for the boiler is indicated with 33 and a floating member with 34, a downward displacement of said floating member 34 stopping the flow of water to the conduit 7. To this aim the rod of the floating member is provided with the magnet 35 which acts on the magnetic switch 36 claimed in another patent of the same applicant. A pressostat 37 is adapted to maintain constant the pressure in the boiler. A safety valve 39 and a further thermally controlled safety device are provided for avoiding the overheating of the water in the boiler. The conduit 41 is in communication with the hose 12.

Operation takes place in the following manner:

Putting the jug 9 on the plate 18, the lever 60 closes on to the contact 11 thereby starting the operation. A certain quantity of ground coffee is put in the container 1 which is then made to slide on the guides 15–16. By rotating the lever 6 (FIGURE 2) the eccentric element 5 is actuated so as to lower the piston 2–4 until the side sealing strip 3 forces against the side walls of said container 1.

From the chamber 26 which has been previously filled with water and now has the tap 28 removed from the drain opening the water flows into the boiler 32 below. The starting push-button 21 is now pressed down (FIGURE 2). The electromagnet 30 (FIGURE 3) provides for the rotation of the rod 29 which closes the tap 28. At this moment the general pilot lamp 23 is turned on.

The heating element 33 starts heating the water in the boiler 32 and when the water has reached the boiling point the slight pressure generated in the boiler 32 and serving to overcome the losses of pressure due to friction in the conduits, pushes the warm water through the outlet 50 up to the container 1 of the ground coffee thereby starting the infusion process. After the entire quantity of warm water has passed through the container the infusion is completed and the jug is full up to the predetermined value.

When the weight of the coffee in the jug 9 reaches the desired value e.g. 300 gr. the contacts 11–11' (FIGURE 3) are made to close thereby turning on the heating plate 18.

While the water leaves the boiler 32, since the tap 28 is closed, the chamber 26 may be filled again with water poured by hand up to the desired level.

When the boiler 32 is completely empty i.e. all the warm water has passed through the ground coffee the magnetic contact 36 is made to open and the heating of the element 33 is interrupted.

The contact 36 releases, by means of a control relay, the electromagnet 30 which determines the opening of the tap 28 thereby providing for the water contained in the chamber 26 to enter again into the boiler 32 to start a new cycle.

Figure 4:
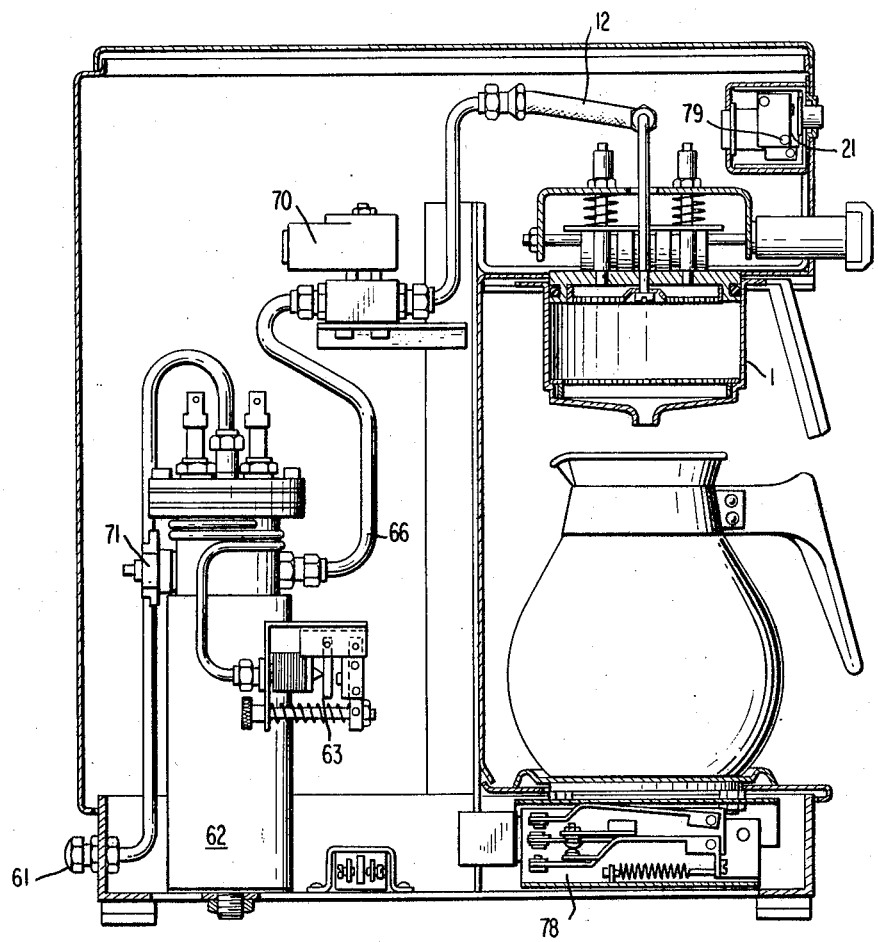
FIGURE 4 is a view of the device of the invention as applied to an instantaneous heating boiler of conventional type.

FIGURE 4 illustrates a modified embodiment wherein the device of the invention is connected to an instantaneous heating boiler 62, said boiler being described in another application of the same applicant. In this case the connection to a drinking water pipe line is required. The relative thermostat is indicated with 63 and the outlet pipe with 66. A solenoid valve 70 is provided for interrupting the outflow of warm water. A thermal safety device for the boiler is indicated with 71.

Operation takes place as follows: by actuating the bush-button 21 (FIGURES 2 and 4) the control relay 79 is turned on: the thermostat 63 opens the solenoid valve 70 and acts upon the resistances heating the water in the boiler so as to turn them off when the temperature reaches 100° C. In consideration of the lowering in temperature along the pipes and especially in the hose 12 the water passes through the ground coffee at a temperature of 80–90° C.

The additional contact 78 turns off the relay 79 when the jug is full.

A further modified embodiment is illustrated in FIGURE 5, wherein the device is applied to a normal express coffee boiler, the warm water is taken from through the hose 90.

FIGURE 6 is a view of a last modification wherein the means for keeping the coffee warm in the additional or reserve jug are placed in the upper part of the machine. Said means comprise electric heating resistances 88, the switch 85 actuating the relay 86. Said switch and said relay consent the turning on of the resistances 88 only when the additional reserve jug is set on said resistances.

Further embodiments and applications are possible without departing from the spirit of the present invention and are intended to be protected by the following claims.

What is claimed is:

1. A device for the preparation of infusion express coffee to be collected in a jug, characterized by:
    a container (1) adapted to receive the uncompressed ground coffee and to enter, sliding similarly to a drawer on guides, underneath a bored plate (2) acting as a shower element;
    a piston located above said container (1) and having its lower base provided with a series of holes and constituting said shower element (2) while its side walls are provided with at least a strip (3) for the hermetical sealing against the inner side walls of said container and its upper surface (4) is adapted to be compressed by an eccentric element (5) actuated by a hand operated lever (6) to provide for said hermetic sealing;
    a warm water feeding conduit (7) located above said container (1) in such a manner that the warm water passes, without any pressure, downwards through the ground coffee, flows out from an outlet nozzle (8) placed below said container and is then collected in a jug (9);
    electric resistances (18) heating the bottom of said jug (9) and adapted to be turned on by a switch (11–11') closed by the jug (9) when the weight of the liquid contained in said jug reaches a certain adjustable value;
    a flexible hose (12) connecting, at one side, said conduit (7) feeding the warm water to the container (1) with, at the other side, the warm water inlet: the length and the outer self-cooling surface of said hose being chosen so as to lower, to some degree, the temperature of the incoming warm water to eliminate any danger of burning the coffee.

2. The device as claimed in claim 1, characterized by an additional switch (60, 11; FIGURE 3) provided in the main circuit to start operation of the whole device only when the jug is placed below the nozzle (8) for the outlet of the coffee, said switch being closed by the weight of the empty jug.

3. The device as claimed in claim 1 characterized in that it is applied to a warm water feeder that does not require to be connected to the drinking water distribution plant and comprises a chamber (26; FIGURE 3) adapted to receive a certain quantity of water poured therein, the bottom surface of said chamber being provided with a conduit section for the outflow into a boiler (32) placed below, said conduit section being closed by a tap (28) operated by means of an electromagnet (30), said boiler containing a heating pipe coil (33), a floating element (34) controlling, over a magnet, an outer switch (36), all these elements serving to stop the device at the end of the coffee outflow, the feeder being completed with a pressostat (37) and a safety valve (40) actuated by thermal expansion.

4. The device as claimed in claim 1, characterized in that it is applied to an instantaneous heating boiler (62;

FIGURE 4) of conventional type, the feeding of which is regulated by means of a solenoid valve (70).

5. The device as claimed in claim 1, characterized in that it is applied to an express coffee boiler (FIGURE 5), the warm water is taken from by means of a pipe (90) connected to the hose (12) of the device.

6. The device as claimed in claim 1, characterized in that the top portion of the machine frame has disposed therein electric resistances (88, FIGURE 6) suited to keep warm an additional or reserve coffee jug; a switch (85) actuating a relay (86) being turned on only when the jug is placed on said electric resistances (88).

References Cited

UNITED STATES PATENTS

| | | | |
|---|---|---|---|
| 2,346,389 | 4/1944 | Peters | 99—282 |
| 3,100,434 | 8/1963 | Bunn | 99—282 |
| 3,179,035 | 4/1965 | Lockett | 99—282 |
| 3,220,334 | 11/1965 | Martin | 99—282 |
| 3,266,410 | 8/1966 | Novi | 99—287 |

ROBERT W. JENKINS, Primary Examiner

U.S. Cl. X.R.

99—287,307